(12) United States Patent
Okamoto et al.

(10) Patent No.: US 12,484,832 B2
(45) Date of Patent: Dec. 2, 2025

(54) BIOSIGNAL ANALYSIS SYSTEM

(71) Applicant: Toray Industries, Inc., Tokyo (JP)

(72) Inventors: Riku Okamoto, Otsu (JP); Shingo Mizuta, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 426 days.

(21) Appl. No.: 18/037,124

(22) PCT Filed: Nov. 15, 2021

(86) PCT No.: PCT/JP2021/041847
§ 371 (c)(1),
(2) Date: May 16, 2023

(87) PCT Pub. No.: WO2022/113792
PCT Pub. Date: Jun. 2, 2022

(65) Prior Publication Data
US 2024/0000364 A1    Jan. 4, 2024

(30) Foreign Application Priority Data

Nov. 24, 2020    (JP) .................................. 2020-194594

(51) Int. Cl.
*A61B 5/361*    (2021.01)
*A61B 5/347*    (2021.01)
(Continued)

(52) U.S. Cl.
CPC .............. *A61B 5/361* (2021.01); *A61B 5/347* (2021.01); *A61B 5/363* (2021.01); *A61B 5/364* (2021.01); *G06N 20/00* (2019.01)

(58) Field of Classification Search
CPC ......... A61B 5/361; A61B 5/347; A61B 5/363; A61B 5/364; A61B 5/7267; A61B 5/349;
(Continued)

(56) References Cited

U.S. PATENT DOCUMENTS

| 9,386,935 B2 | 7/2016 | Kimura et al. |
| 2014/0142448 A1 | 5/2014 | Bae et al. |

(Continued)

FOREIGN PATENT DOCUMENTS

| CN | 104027109 A | 9/2014 |
| CN | 106037702 A | 10/2016 |

(Continued)

OTHER PUBLICATIONS

He et al., "Automatic Detection of Atrial Fibrillation Based on Continuous Wavelet Transform and 2D Convolutional Neural Networks", Frontiers in Physiology, Aug. 2018, vol. 9, Article 1206, 11 pages.

(Continued)

*Primary Examiner* — Mark W. Bockelman
(74) *Attorney, Agent, or Firm* — BUCHANAN INGERSOLL & ROONEY PC

(57) ABSTRACT

Provided is an integrated biosignal analysis system performing determination of arrhythmia based on electrocardiographic information. The biosignal analysis system includes: an input unit configured to receive input of the electrocardiographic information; a data conversion unit configured to perform time-frequency conversion on the electrocardiographic information to generate data for determination; a data restoration unit configured to restore the data for determination using a learned model including a autoencoder to generate restored data; a difference calculation unit configured to calculate a difference amount between the restored data and the data for determination; and a determination unit configured to determine whether the data for determination is either of normal waveform data and arrhythmic waveform data based on the difference amount.

11 Claims, 14 Drawing Sheets

(51) Int. Cl.
*A61B 5/363* (2021.01)
*A61B 5/364* (2021.01)
*G06N 20/00* (2019.01)

(58) Field of Classification Search
CPC ...... G06N 20/00; G06N 3/0455; G06N 3/088; G06N 3/084
See application file for complete search history.

(56) References Cited

U.S. PATENT DOCUMENTS

| | | |
|---|---|---|
| 2014/0221860 A1 | 8/2014 | Kimura et al. |
| 2014/0257124 A1 | 9/2014 | Morita |
| 2016/0302680 A1 | 10/2016 | Narusawa et al. |
| 2019/0059763 A1 | 2/2019 | Shakur et al. |
| 2020/0074281 A1 | 3/2020 | Dindin et al. |
| 2022/0151532 A1 | 5/2022 | Nagasawa et al. |

FOREIGN PATENT DOCUMENTS

| | | |
|---|---|---|
| CN | 111084621 A | 5/2020 |
| CN | 111261278 A | 6/2020 |
| CN | 111261289 A | 6/2020 |
| CN | 111265210 A | 6/2020 |
| EP | 4252652 * | 7/2025 |
| JP | 2014100473 A | 6/2014 |
| JP | 2014150826 A | 8/2014 |
| JP | 2018189522 A | 11/2018 |
| JP | 2019033878 A | 3/2019 |
| JP | 2020036633 A | 3/2020 |
| JP | 2020156927 A | 10/2020 |
| KR | 10-2009-0089039 A | 8/2009 |
| KR | 10-2020-0052421 A | 5/2020 |

OTHER PUBLICATIONS

International Search Report and Written Opinion for International Application No. PCT/JP2021/041847, dated Feb. 1, 2022, 5 pages.
Japanese Notice of Reasons for Refusal for Japanese Application No. 2021-570835, dated Aug. 23, 2022, with English Translation, 4 pages.
Logan et al., "Robust Detection of Atrial Fibrillation for a Long Term Telemonitoring System", Computers in Cardiology, 2005;32:619-622.
Qayyum et al., "Classification of Atrial Fibrillation with Pre-Trained Convolutional Neural Network Models", 2018 IEEE-EMBS Conference on Biomedical Engineering and Sciences (IECBES), pp. 594-599.
Takahashi et al., "Feature Extraction and Arrhythmia Classification from 2-lead ECG using Stacked 1D-convolutional Denoising Autoencoders", Information Processing Society of Japan, Dec. 2018, vol. 59, No. 12, pp. 2213-2220. Abstract in English language.
Alguliyev et al., "Privacy-Preserving Deep Learning Algorithm for Big Personal Data Analysis", Journal of Industrial Information Integration, (Sep. 30, 2019), vol. 15, pp. 1-14.
Office Action (The First Office Action) issued Jun. 19, 2025, by the State Intellectual Property Office of People's Republic of China in corresponding Chinese Patent Application No. 202180078704.9 and an English translation of the Office Action. (12 pages).
The extended European Search Report issued Sep. 9, 2024, by the European Patent Office In corresponding European Patent Application No. 21897766.8-1113. (6 pages).

* cited by examiner

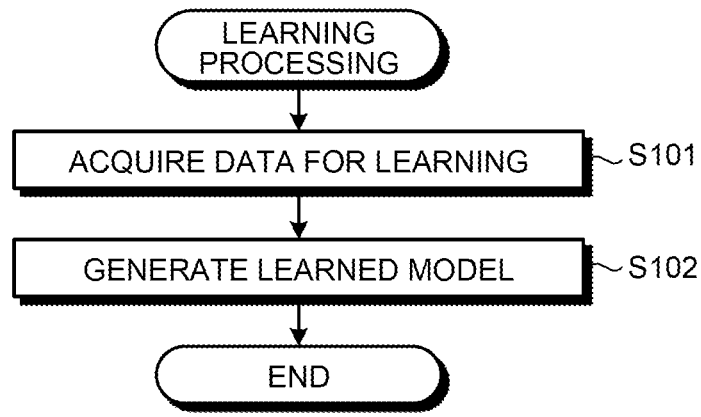
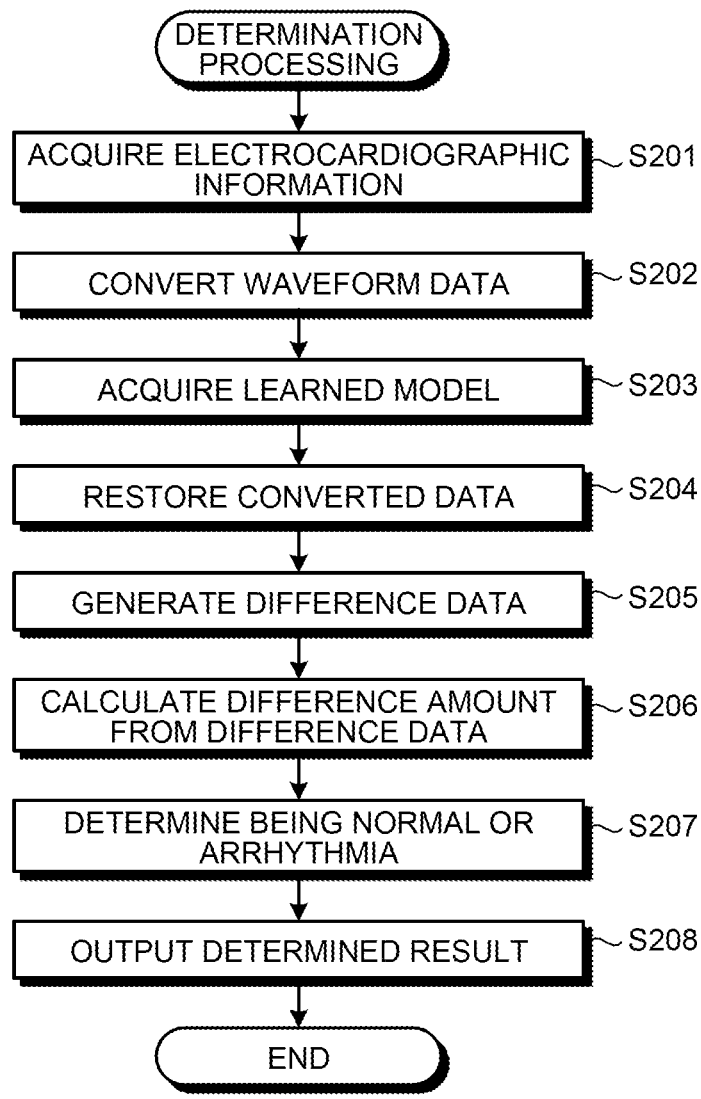

BIOSIGNAL ANALYSIS SYSTEM

CROSS REFERENCE TO RELATED APPLICATIONS

This is the U.S. National Phase application of PCT/JP2021/041847, filed Nov. 15, 2021, which claims priority to Japanese Patent Application No. 2020-194594, filed Nov. 24, 2020, the disclosures of each of these applications being incorporated herein by reference in their entireties for all purposes.

FIELD OF THE INVENTION

The present invention relates to an integrated biosignal analysis system determining being normal or arrhythmia based on an electrocardiographic signal (hereinafter, electrocardiographic information), for example.

BACKGROUND OF THE INVENTION

The heart repeats contraction and expansion to play a role of a pump sending blood to the whole body. This activity maintains regularity by weak electric stimulation in myocardial cells, but if an abnormality appears in this electric stimulation, an abnormality also occurs in the activity of the heart. This is called arrhythmia. There are various types of arrhythmias, and examples thereof include ventricular fibrillation, which causes cardiac arrest and has high fatality, ventricular tachycardia, and atrial fibrillation, which causes cerebral infarction. Thus, determining arrhythmia is very important, and determining arrhythmia is being performed using electrocardiographic information acquired from an object to be determined with a biosignal measuring device.

However, for determination of arrhythmia, a physician visually examines long-term, continuous electrocardiographic information to perform diagnosis, which places a heavy burden on the physician. Given this situation, apparatuses and methods for biosignal analysis to automatically determine arrhythmia are being used (refer to Non Patent Literature 1 and 2, for example).

The method described in Non Patent Literature 1 is to perform determination limited to atrial fibrillation among arrhythmias. Atrial fibrillation is an arrhythmia in which the parts called the atrium trembles due to abnormal electric excitation, and examples of features for determining it from electrocardiographic information include the occurrence of an F wave, which is a trembling component, and the abnormality of a heartbeat cycle (hereinafter, an RR ratio). Non Patent Literature 1 focuses on the latter, in which in a histogram with the RR ratio on the horizontal axis, variations are larger in atrial fibrillation than in normal sinus rhythm (hereafter, a normal waveform), from which atrial fibrillation is determined.

The method described in Non Patent Literature 2, which focuses on atrial fibrillation as in Non Patent Literature 1, performs automatic analysis by machine learning. Non Patent Literature 2 segments acquired electrocardiographic information every 15 seconds, which are subjected to time-frequency conversion to reveal waveform features, which are classified into four categories including "normal waveform, noise, atrial fibrillation, and others", which have already been learned, to determine atrial fibrillation.

Non Patent Literature

Non Patent Literature 1: B. Logan and J. Healey, "Robust detection of atrial fibrillation for a long term telemonitoring system," Computers in Cardiology, 2005, Lyon, 2005, pp. 619-622, doi: 10.1109/CIC.2005.1588177.

Non Patent Literature 2: A. Qayyum, F. Meriaudeau and G. C. Y. Chan, "Classification of Atrial Fibrillation with Pre-Trained Convolutional Neural Network Models," 2018 IEEE-EMBS Conference on Biomedical Engineering and Sciences (IECBES), Sarawak, Malaysia, 2018, pp. 594-599, doi: 10.1109/IECBES.2018.8626624.

SUMMARY OF THE INVENTION

However, Non Patent Literature 1 and Non Patent Literature 2 have the following problems.

Non Patent Literature 1 can only determine arrhythmias characterized by the abnormality of the RR ratio. As described above, there are various types of arrhythmias, and some arrhythmias, such as ventricular tachycardia, are not characterized by the RR ratio, which causes these arrhythmias to be missed. To evaluate the abnormality of the RR ratio from variations, the arrhythmia (variations) is required to be continuous over a long period of time to determine atrial fibrillation, and it is difficult to determine arrhythmias occurring suddenly.

Non Patent Literature 2 requires prior learning and thus cannot perform determination of unlearned arrhythmias.

An object of the present invention is to solve the above problems of conventional technologies and provide an integrated biosignal analysis system capable of determining whether there arises arrhythmia from electrocardiographic information regardless of the type of arrhythmia.

An integrated biosignal analysis system according to embodiments of the present invention achieving the above object includes the following configurations.

(1) Provided is an integrated biosignal analysis system performing determination of arrhythmia based on electrocardiographic information. The biosignal analysis system includes:
   an input unit configured to receive input of the electrocardiographic information;
   a data conversion unit configured to perform time-frequency conversion on the electrocardiographic information to generate data for determination;
   a data restoration unit configured to restore the data for determination using a learned model including an autoencoder to generate restored data;
   a difference calculation unit configured to calculate a difference amount between the restored data and the data for determination; and
   a determination unit configured to determine whether the data for determination is either of normal waveform data and arrhythmic waveform data based on the difference amount.

(2) In the biosignal analysis system according to (1), the learned model is a model generated by learning using a plurality of pieces of known data for learning, 95% or more of which are generated based on normal waveform data.

(3) In the biosignal analysis system according to (1), the learned model is a model generated by learning using a plurality of pieces of known data for learning, 95% or more of which are generated based on normal waveform data, and data for learning acquired from an object for which determination is performed.

(4) In the biosignal analysis system according to (1), the learned model is a model generated by learning using data for learning acquired from an object to be determined.

(5) In the biosignal analysis system according to any one of (1) to (4), the input unit is configured to segment waveform data of the electrocardiographic information into unit waveform data in which waveform data in a predetermined time range is extracted, and the data conversion unit is configured to perform time-frequency conversion on the unit waveform data to generate the data for determination.

(6) In the biosignal analysis system according to any one of (1) to (5), the data conversion unit is configured to generate weighted data in which a time-frequency feature region of arrhythmia in the data for determination is weighted.

(7) In the biosignal analysis system according to any one of (1) to (6), the difference calculation unit is configured to generate difference data indicating a difference between the restored data and the data for determination and calculate the difference amount based on the difference data, and the determination unit is configured to identify an arrhythmia factor based on a time and frequency feature of the difference data.

(8) In the biosignal analysis system according to any one of (1) to (7), the learned model is a model generated by learning using data for learning known to be the normal waveform data.

(9) The biosignal analysis system according to any one of (1) to (8) further includes a learning unit configured to perform learning of the auto-encoder using data for learning to generate the learned model.

(10) The biosignal analysis system according to (2) further includes a learning unit configured to perform learning of the auto-encoder using the data for learning to generate the learned model. The learning unit includes a plurality of auto-encoders corresponding to features of the known data for learning, and is configured to select one auto-encoder from the auto-encoders based on a feature of normal waveform data of an object to be determined.

(11) The biosignal analysis system according to (3) further includes a learning unit configured to perform learning of the auto-encoder using the data for learning to generate the learned model. The learning unit includes a plurality of data groups for learning or a plurality of auto-encoders corresponding to features of the pieces of known data for learning and is configured to select one data group for learning or one auto-encoder from the data groups for learning or the auto-encoders based on a feature of normal waveform data of an object to be determined.

The present invention can provide an integrated biosignal analysis system capable of determining whether there arises arrhythmia from electrocardiographic information regardless of the type of arrhythmia.

BRIEF DESCRIPTION OF DRAWINGS

FIG. 4 is a flowchart of learning processing according to the first embodiment.

FIG. 5 is a flowchart of determination processing according to the first embodiment.

DETAILED DESCRIPTION OF EMBODIMENTS OF THE INVENTION

The following describes embodiments of an integrated biosignal analysis system according to embodiments of the present invention in detail based on the accompanying drawings. The present invention is not limited by these embodiments. The individual embodiments of the present invention are not independent of each other and can be performed as appropriate combined with each other.

First Embodiment

Figure 1:
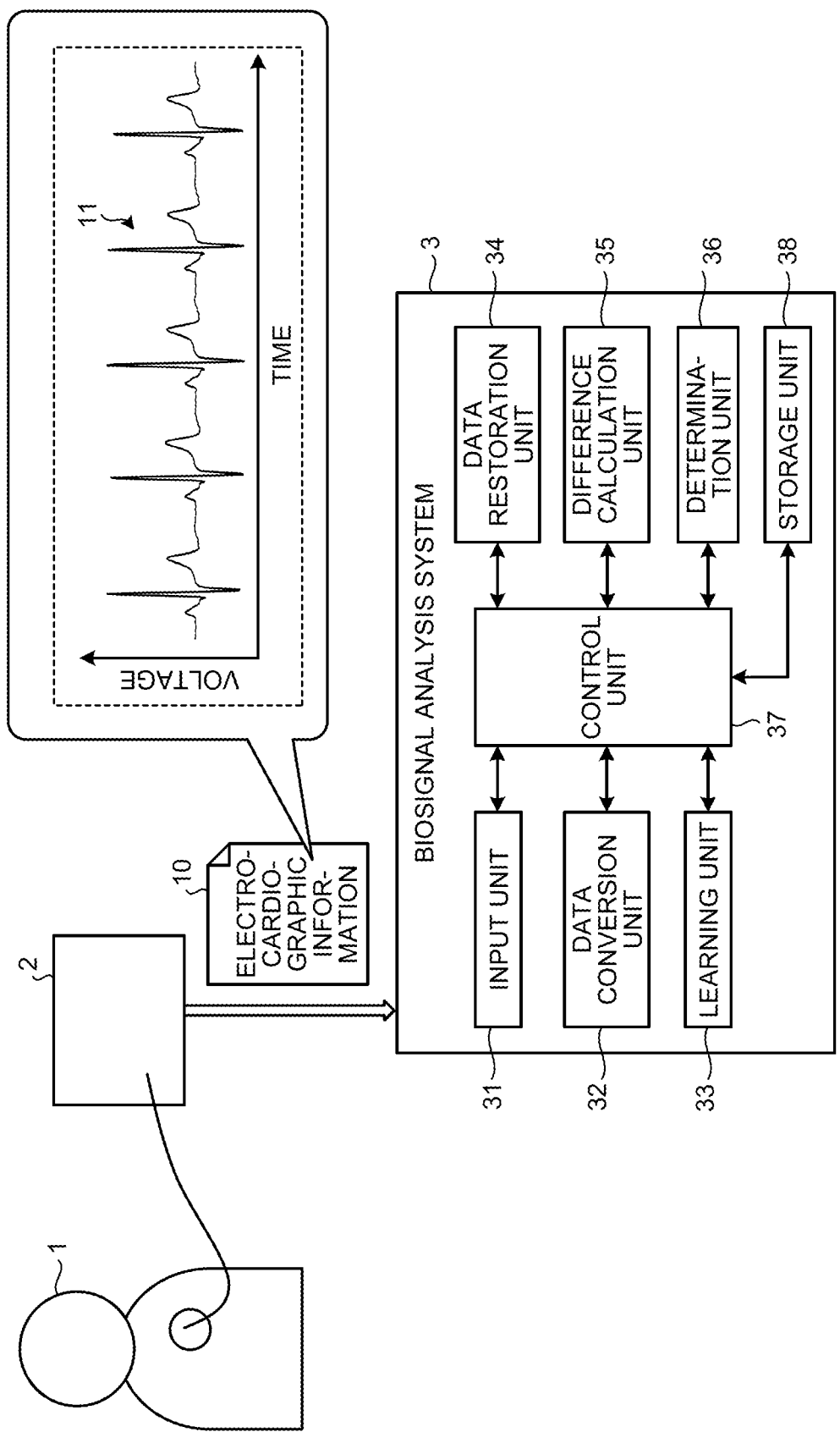
FIG. 1 is a diagram of a configuration example of an integrated biosignal analysis system according to a first embodiment.

FIG. 1 is a diagram of a configuration example of an integrated biosignal analysis system according to a first embodiment of the present invention. According to FIG. 1, electrocardiographic information 10 to be analyzed is acquired from an object 1 to be determined via a biosignal measuring device 2. The object 1 to be determined is a human, an animal, and the like, which is not limited to a particular object. Examples of the biosignal measuring device 2 include an electrocardiograph.

The electrocardiographic information 10 acquired from the object to be determined includes information on the object 1 to be determined, the date, time, and place of acquisition, and a measurement result. The measurement result is waveform data 11 obtained by performing plotting with time on the horizontal axis and voltage on the vertical axis (refer to FIG. 1).

Figure 2:
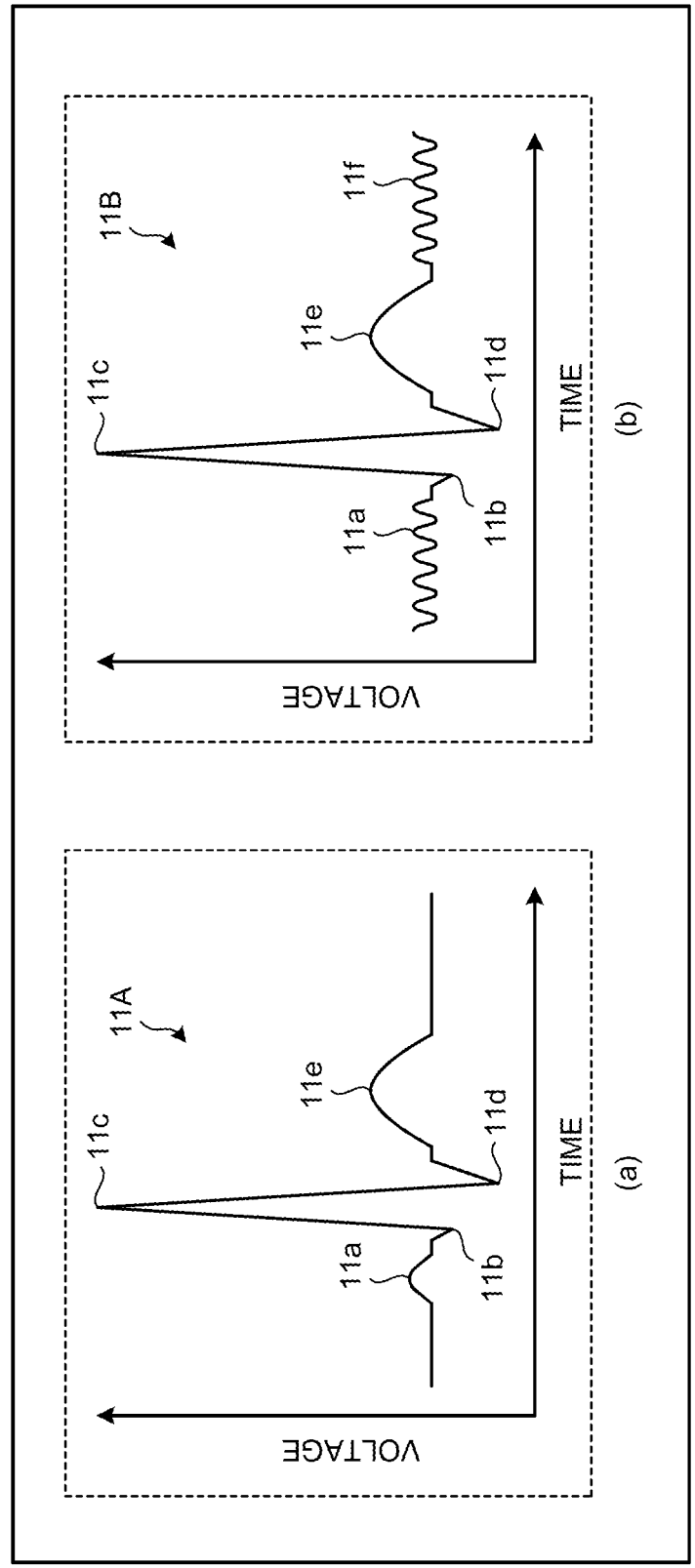
FIG. 2 is a diagram of a detailed example of electrocardiographic information for use in analysis.

FIG. 2 is a diagram of a detailed example of the electrocardiographic information 10 for use in analysis. (a) of FIG. 2 illustrates waveform data 11A of a normal pulse, whereas (b) of FIG. 2 is an example of waveform data 11B of atrial fibrillation in which an F wave occurs. Each waveform data can contain components called a P wave 11a, a Q wave 11b, an R wave 11c, an S wave 11d, a T wave lie, and an F wave 11f, and these shapes are used as criteria for arrhythmia. The waveform data of the electrocardiographic information 10 may change its shape depending on the object to be determined and/or the biosignal measuring device.

Referring back to FIG. 1, this biosignal analysis system 3 according to an embodiment of the present invention includes an input unit 31, a data conversion unit 32, a learning unit 33, a data restoration unit 34, a difference calculation unit 35, a determination unit 36, a control unit 37, and a storage unit 38.

The input unit 31 receives input of the electrocardiographic information output from the biosignal measuring device 2. The input unit 31 extracts unit waveform data from the waveform data 11 of the acquired electrocardiographic information. The input unit 31 includes a connector electrically connecting to the biosignal measuring device 2, a communication apparatus including means to communicate with the biosignal measuring device 2, or an input port for media in which data is stored and may further include user interfaces such as a keyboard, a mouse, and a microphone.

The data conversion unit 32 applies conversion processing to the electrocardiographic information 10. Specifically, frequency analysis is applied to waveform data showing the relation between time and intensity (voltage in this case) to generate three-dimensional time-frequency-intensity feature data.

Figure 3:
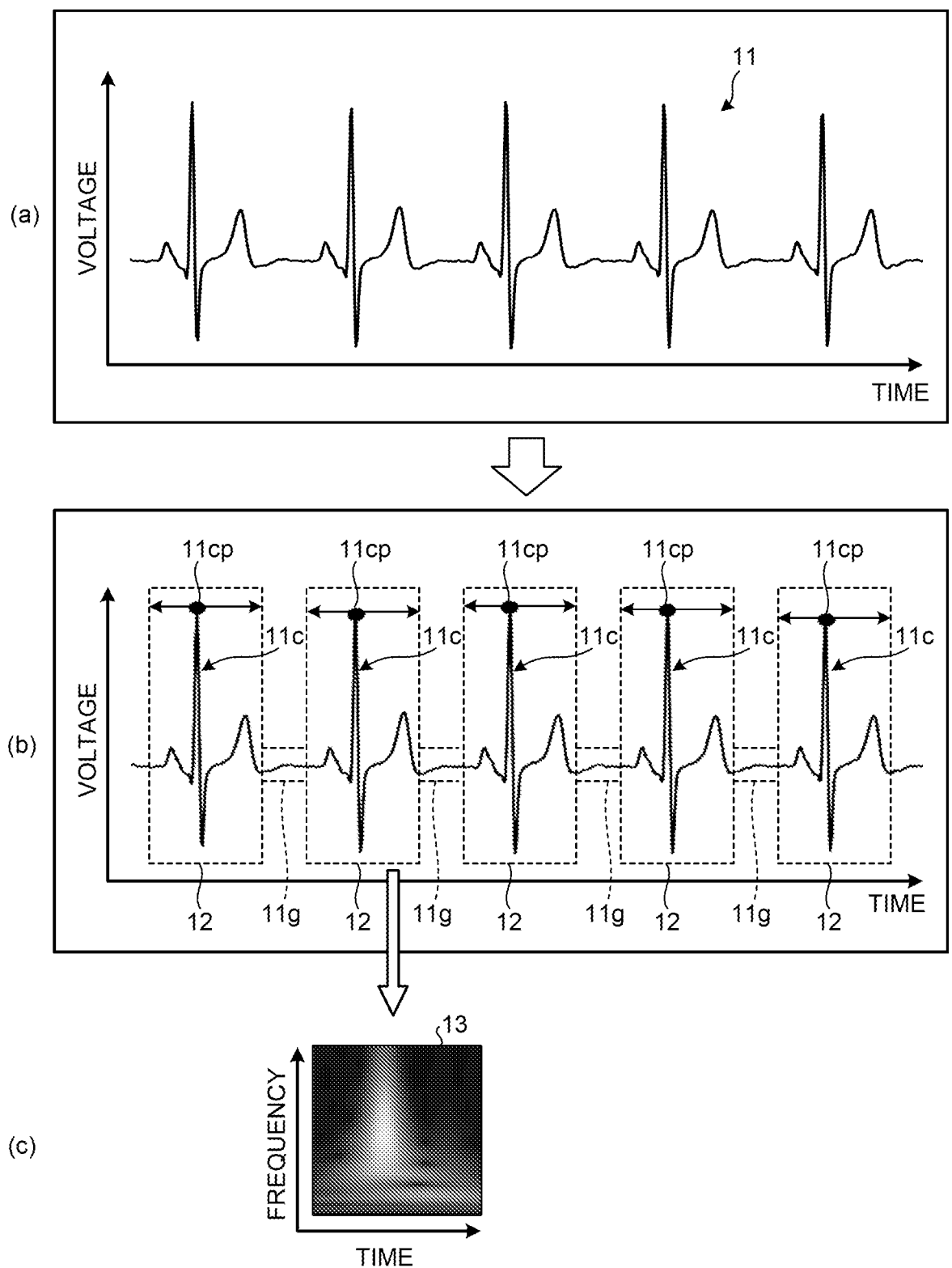
FIG. 3 is a diagram of a processing example by an input unit for the electrocardiographic information according to the first embodiment.

FIG. 3 is a diagram of a processing example by the input unit 31 for the electrocardiographic information according to the first embodiment. The input unit 31 generates unit waveform data 12 extracted for each designated unit for the waveform data 11 illustrated in (a) of FIG. 3 (refer to (b) of FIG. 3) and registers it in the storage unit 38. Examples of the extraction of the unit waveform data 12 include setting a designated period as a unit based on time axis information and setting a designated number of waveforms as a unit with a peak position of the R wave 11c as an extraction reference position, but this is not limiting. In the example illustrated in FIG. 3, a peak position 11cp of the R wave 11c is detected, and a designated number of seconds before and after the peak position 11cp of the R wave 11c are set as one unit, and thereby the unit waveform data 12 represents a single waveform based on the waveform data 11. Subsequently, the data conversion unit 32 applies processing to generate three-dimensional feature data 13 from the unit waveform data 12 (refer to (c) of FIG. 3.

In the waveform data 11, the intervals of the pieces of unit waveform data 12 are not constant due to fluctuations in heartbeat. Segmentation by each unit waveform improves the learning accuracy of an auto-encoder 41 in the learning unit 33 described below and inhibits mixing of noise into difference data and a difference amount in the difference calculation unit 35, and thus the accuracy of determination of arrhythmia improves. In addition, sections that do not have useful information for determination, such as out-of-unit waveform data 11g in (b) of FIG. 3, are excluded, and thus the amount of processing can be reduced. In the example illustrated in FIG. 3, to perform segmentation by each unit waveform, the designated number of seconds before and after the peak position 11cp of the R wave 11c detected from the maximum value of a certain section are set as one unit waveform, but this is not limiting. If the waveform data does not have the R wave 11c and the peak position 11cp of the R wave 11c cannot be detected, the input unit 31 determines the maximum value of the waveform data and extracts a designated number of seconds before and after that time, as a reference position, as one unit.

The learning unit 33 performs learning optimizing network parameters of a neural network to generate a learned model. The learning unit 33 has an auto-encoder and performs learning of the auto-encoder with three-dimensional feature data generated based on the electrocardiographic information as data for learning. Examples of the learning include learning using the error back-propagation method and the stochastic gradient descent method. The learning unit 33 causes the storage unit 38 to store therein the learned model after learning (hereinafter, also referred to simply as the learned model).

The following describes learning processing by the learning unit 33. FIG. 4 is a flowchart of learning processing by the biosignal analysis system 3. In the learning processing, the three-dimensional feature data 13 is acquired as the data for learning from the unit waveform data, which has been generated by the data conversion unit 32 applying each processing based on the electrocardiographic information 10 input to the input unit 31 (Step S101). The learning unit 33 performs learning of the auto-encoder using the generated data for learning and outputs the learned model after learning. In this process, a plurality of pieces of data for learning are prepared, and the pieces of data for learning that are known to be normal or arrhythmia, the majority of which are of normal waveform origin, are used. The "majority" referred to here is 95% or more. "Normal" to be employed as the data for learning refers to one determined to be "normal" by a physician, a clinical examination technician, and the like. In the present first embodiment, the learning unit 33 performs learning using only data for learning based on normal pulse waveform data (normal waveform data). It is preferable for the learning unit 33 to use only the normal waveform data in terms of increasing the accuracy of determination, but this is not limiting.

Referring back to FIG. 1, the data restoration unit 34 performs restoration processing on the three-dimensional feature data generated by the data conversion unit 32, the three-dimensional feature data obtained from the object 1 to be determined (hereinafter, also referred to as data for determination) using the learned model generated by the learning unit 33.

The difference calculation unit 35 calculates a difference amount of the data before and after the restoration processing by the data restoration unit 34. Specifically, the difference calculation unit 35 generates difference data between the three-dimensional feature data before restoration and the three-dimensional feature data after restoration and calculates the difference amount based on the difference data.

The determination unit 36 determines whether the pulse of the object 1 to be determined is the normal waveform data or arrhythmic waveform data based on the difference amount calculated by the difference calculation unit 35.

The control unit 37 comprehensively controls the operation of the biosignal analysis system 3. The control unit 37 causes a display to display determined results by the determination unit 36 or outputs them externally.

The storage unit 38 stores therein various data including various computer programs for operating the biosignal analysis system 3 and data generated by the units. The various computer programs include a determination program to be executed using the learned model. The storage unit 38 includes a read only memory (ROM) in which the various computer programs and the like are installed in advance and a random access memory (RAM), a hard disk drive (HDD), and a solid state drive (SSD) storing therein calculation parameters and data for each processing and the like.

The various computer programs can also be recorded on computer-readable recording media such as an HDD, a flash memory, a compact disc read only memory (CD-ROM), a digital versatile disc read only memory (DVD-ROM), and Blu-ray (registered trademark) to be widely distributed. It is also possible for the input unit 31 to acquire various computer programs via a communication network. The communication network referred to here is one including an existing public line network, a local area network (LAN), or a wide area network (WAN), for example, and may be wired or wireless.

The biosignal analysis system 3 having the above functional configuration is a computer including one or a plurality of pieces of hardware such as a central processing unit (CPU), a graphics processing unit (GPU), an application specific integrated circuit (ASIC), and a field programmable gate array (FPGA).

The following describes determination processing for being normal or arrhythmia based on the electrocardiographic information obtained from the object 1 to be determined. FIG. 5 is a flowchart of the determination processing according to the first embodiment. In the determination processing, first, the input unit 31 acquires the electrocardiographic information 10 obtained from the object 1 to be determined via the biosignal measuring device 2 (Step S201). The input unit 31 generates the unit waveform data 12, which is partial extraction of the waveform data 11 of the acquired electrocardiographic information 10.

The data conversion unit 32 converts the unit waveform data to generate the three-dimensional feature data (Step S202). This three-dimensional feature data serves as the data for determination or the data for learning.

Figure 6A:
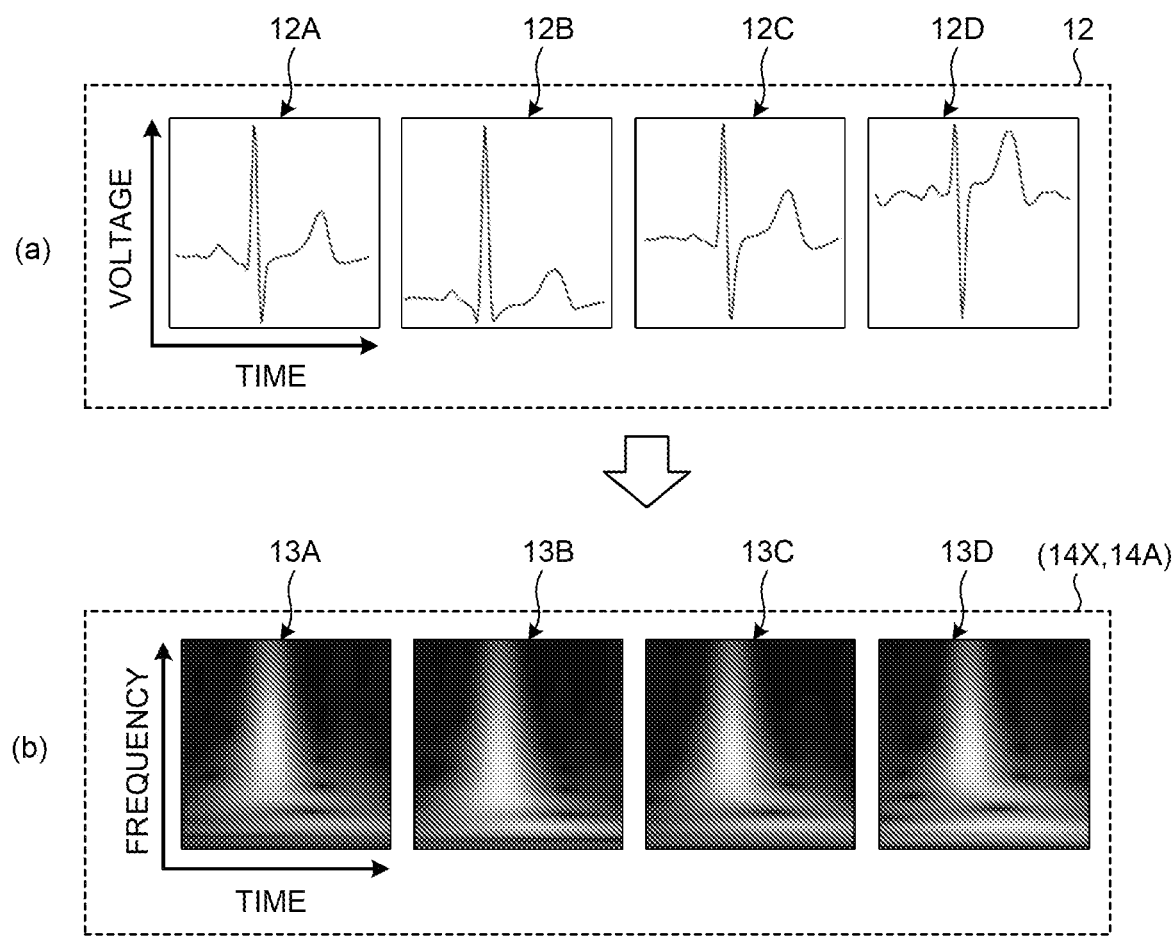
FIG. 6A is a diagram (No. 1) of a processing example by a data conversion unit according to the first embodiment.
Figure 6B:
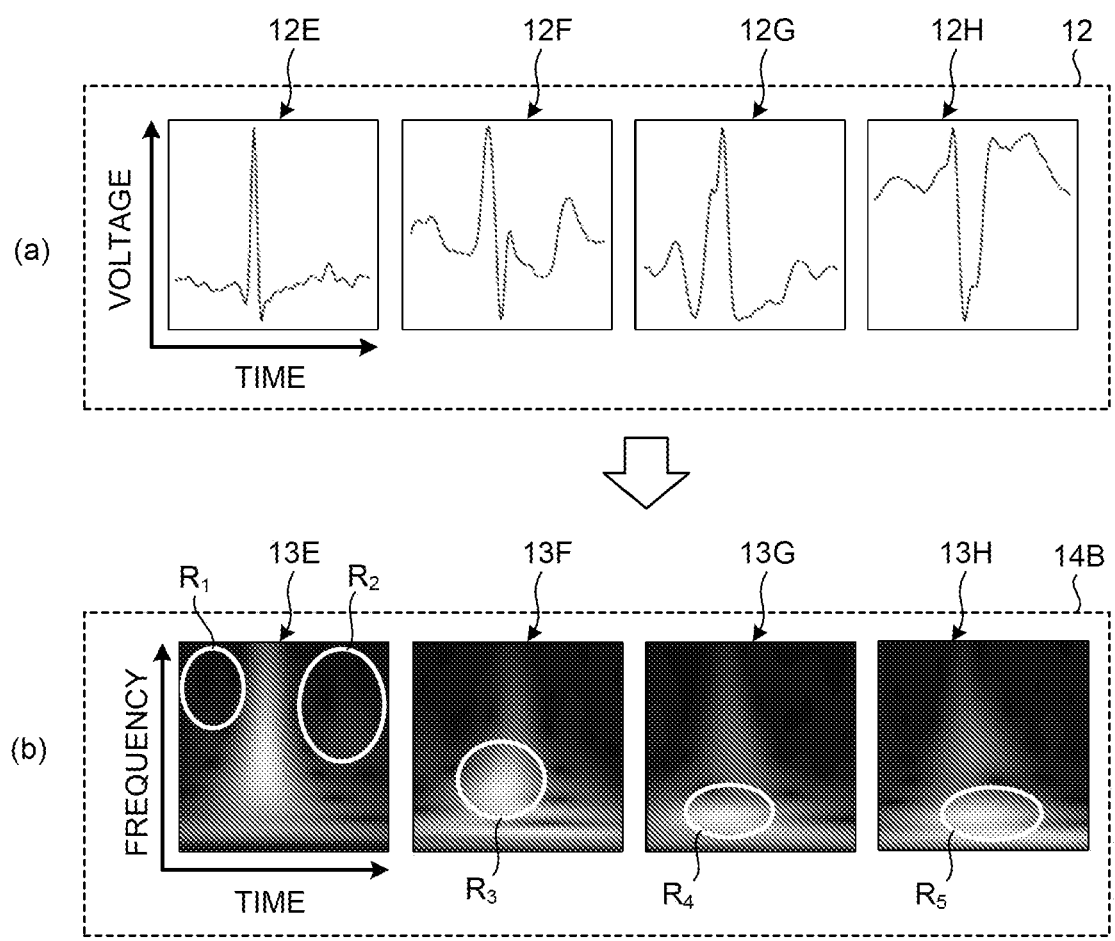
FIG. 6B is a diagram (No. 2) of the processing example by the data conversion unit according to the first embodiment.

FIG. 6A and FIG. 6B are diagrams of processing examples by the data conversion unit 32 according to the first embodiment. FIG. 6A illustrates an example of various data in a normal waveform, and FIG. 6B illustrates an example of various data in an arrhythmic waveform. In addition, (a) in each drawing illustrates the unit waveform data, and (b) illustrates the data for learning or the data for determination. The data conversion unit 32 applies time-frequency conversion to the unit waveform data 12 obtained by the input unit 31. In this process, known data 14X for learning is obtained as the three-dimensional feature data for the learning processing, and data 14A and 14B for determination are obtained as the three-dimensional feature data for the determination processing. For convenience, a distinction is made between the data 14A for determination (the normal waveform: FIG. 6A) and the data 14B for determination (the arrhythmic waveform: FIG. 6B), but in reality, it is unknown whether they are the normal waveform or the arrhythmic waveform. For the time-frequency conversion, general frequency conversion methods such as short-time Fourier transform and wavelet transform can be used, for example, but this is not limiting. The known data 14X for learning and the data 14A and 14B for determination are desirably treated as numerical data, but they can also be treated as another format, such as image data.

Four pieces of unit waveform data (normal unit waveform data) 12A to 12D in FIG. 6A are acquired from different objects to be determined, and it can be seen that the waveform shape differs from one object to be determined to another. Examples of the differences among individuals include the amount of depression of the S-wave and the height of the T-wave. When the time-frequency conversion by the data conversion unit 32 is applied to these pieces of unit waveform data 12A to 12D, three-dimensional feature data 13A to 13D are obtained. These pieces of three-dimensional feature data 13A to 13D are used as the known data 14X for learning and the data 14A for determination of normal waveform origin, reducing the differences among individuals compared to those of the unit waveform data 12A to 12D. Thus, it is also possible to improve the accuracy of learning by diverting the known data 14X for learning (the three-dimensional feature data 13A to 13D) obtained from different objects in the learning unit 33 described below.

Four pieces of unit waveform data (arrhythmic unit waveform data) 12E to 12H in FIG. 6B are each an example of major arrhythmia or its sign. The object of the biosignal analysis system 3 is to distinguish between the unit waveform data 12A to 12D and the unit waveform data 12E to 12H. However, it is difficult to capture the data features of the pieces of unit waveform data as they are, and it is difficult to distinguish between them. Thus, by applying the time-frequency conversion by the data conversion unit 32 in the same way, three-dimensional feature data 13E to 13H are obtained. These pieces of three-dimensional feature data 13E to 13H are used as the data 14B for determination of arrhythmic waveform origin, and arrhythmia-specific features appear in the regions $R_1$ to $R_5$ illustrated in (b) of FIG. 6B, making a distinction from the normal waveform easy.

After data conversion, the data restoration unit 34 acquires the learned model generated by the learning unit 33 (Step S203). In this process, the data restoration unit 34 refers to the storage unit 38 to acquire the learned model or acquires the learned model from the learning unit 33.

Figure 7:
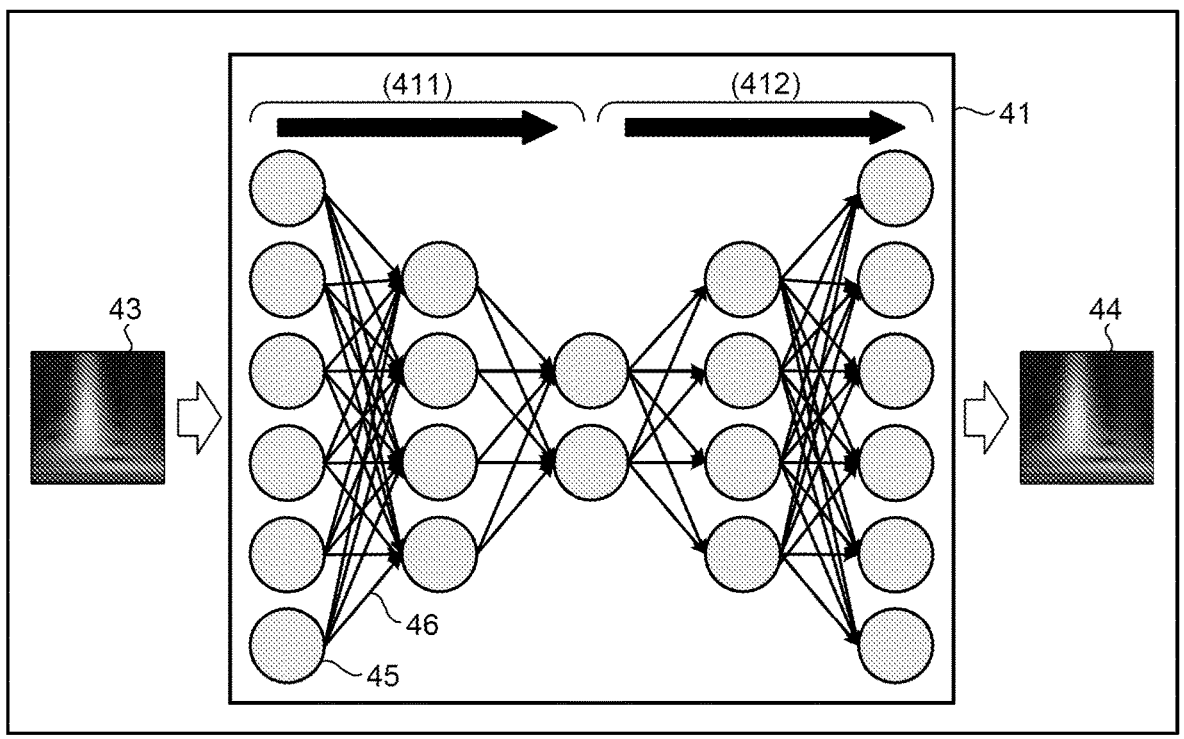
FIG. 7 is a diagram of a configuration of an auto-encoder according to the first embodiment.
Figure 8:
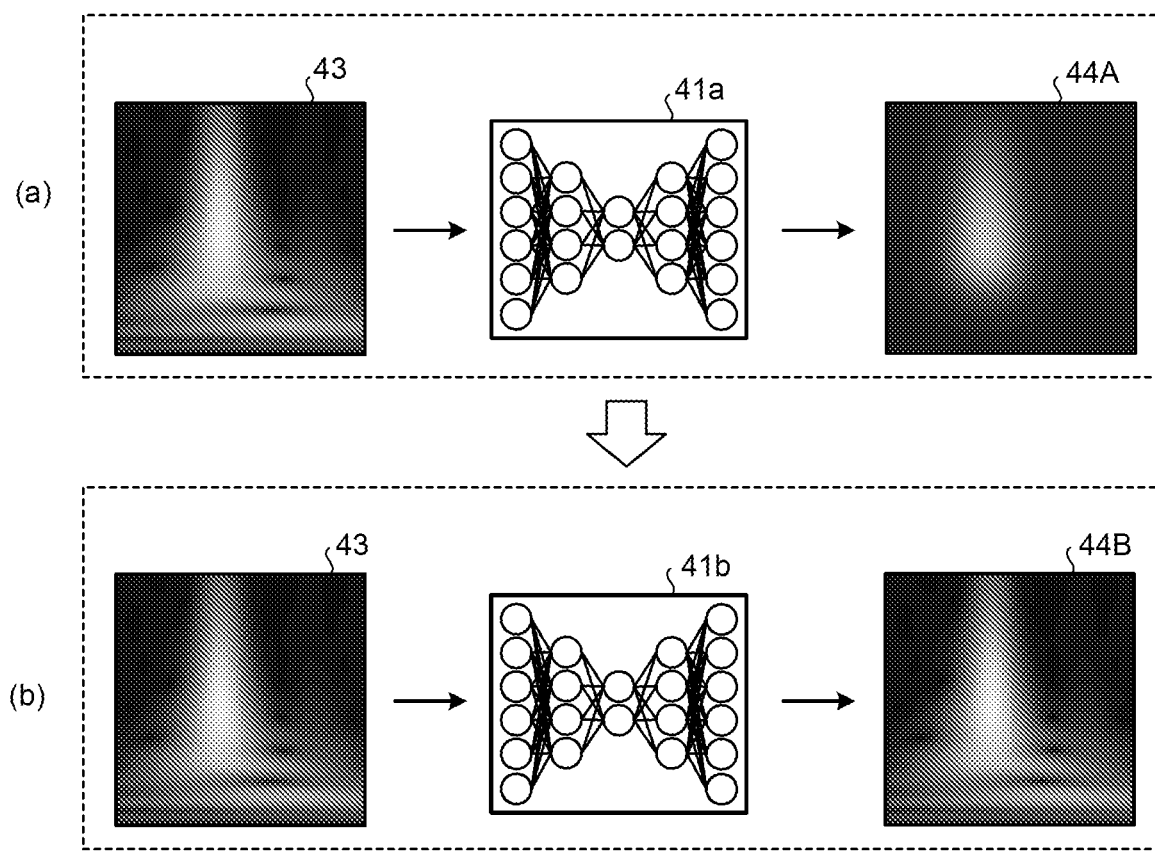
FIG. 8 is a diagram of a processing example by a learning unit according to the first embodiment.

The following describes the learned data generated by the learning unit 33 with reference to FIG. 7 and FIG. 8. FIG. 7 is a diagram of a configuration of the auto-encoder according to the first embodiment. As illustrated in FIG. 7, the auto-encoder 41 is a neural network model including an encoder 411 and a decoder 412. The encoder 411 weights a feature of each node 45 with a unique weight at each edge 46 and inputs the feature to the node 45 in the next layer while reducing the number of dimensions. This processing enables the feature of input data 43 to be compressed to a lower dimension. The decoder 412 performs processing opposite to that by the encoder 411 to generate restored data 44. That is, the restored data 44 is a reconstruction of the input data 43 from the feature compressed by the encoder 411. In the following, the compression of the feature by the encoder 411 is referred to as feature extraction and the reconstruction of the feature by the decoder 412 is referred to as restoration. Regarding the input and output of the auto-encoder 41, in the learning processing, the input data 43 indicates the data 14X for learning, and in the determination processing, the input data 43 indicates the data for determination. The number of layers of the auto-encoder 41 and the number of nodes 45 of each layer are not limited in the present first embodiment.

FIG. 8 is a diagram of a processing example by the learning unit 33 according to the first embodiment. The learning unit 33 performs learning of the auto-encoder 41 using the data for learning. The auto-encoder performs the restoration to generate restored data based on the feature extraction of the input data 43 input as the data for learning and an extracted feature. (a) of FIG. 8 represents an initial stage of learning, and (b) of FIG. 8 represents a stage in which learning has progressed to some extent. As illustrated in (a) of FIG. 8, when learning is still insufficient, the accuracy of the feature extraction is low, and restored data (in learning) 44A does not restore the input data 43. By learning of an auto-encoder 41a (refer to (a) of FIG. 8), the amount of weighting at each edge 46 is adjusted so that the difference between the input data 43 and the restored data (in learning) 44A is reduced. As learning progresses in this way, the state changes from (a) of FIG. 8 to (b) of FIG. 8. Specifically, an auto-encoder 41b, which has progressed in learning, has performed the feature extraction for the input data 43 and can thus generate restored data 44B, which is restored with high accuracy.

In the present first embodiment, the learned model is learned using only the data 14X for learning known to be normal, which enables the feature extraction and the restoration of the normal waveform, in which the known data 14X for learning necessary for learning of the learned model is obtained from the unit waveform data 12A to 12D, which are easily available in large quantities, for example. Thus, there is no need to learn arrhythmia to be detected as in the past, and the data for learning is easily available, and thus it is easy to improve the accuracy of learning.

Upon acquisition of the learned model, the data restoration unit 34 performs restoration processing using the data for determination generated at Step S202 and the learned model generated by the learning unit 33 (Step S204). The restoration processing gives three-dimensional feature data in which the data for determination generated at Step S202 is restored.

Figure 9A:
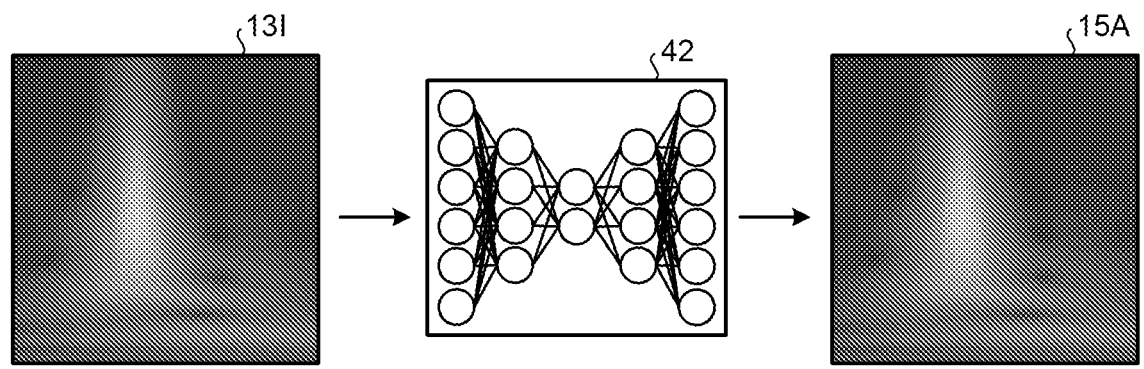
FIG. 9A is a diagram (No. 1) of a processing example by a data restoration unit according to the first embodiment.
Figure 9B:
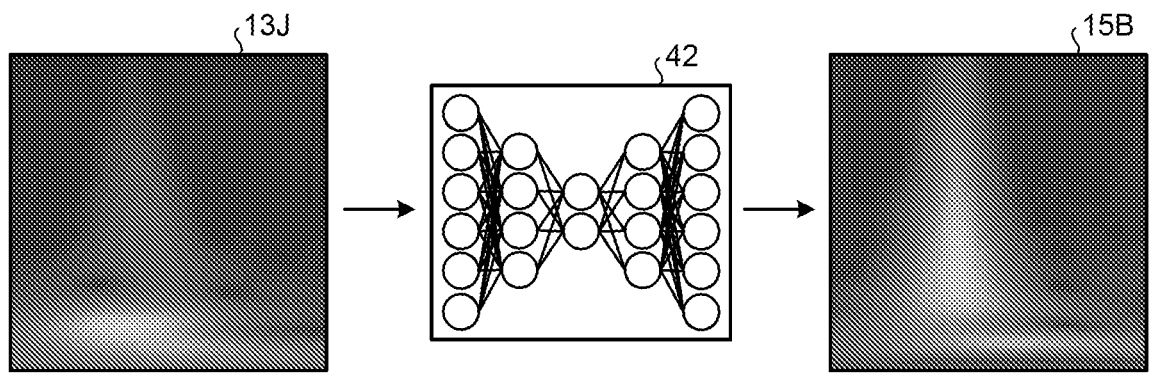
FIG. 9B is a diagram (No. 2) of the processing example by the data restoration unit according to the first embodiment.

FIG. 9A and FIG. 9B are diagrams of processing examples by the data restoration unit 34 according to the first embodiment. For convenience, a distinction is made between data 131 for determination (the normal waveform: FIG. 9A) and data 13J for determination (the arrhythmic waveform: FIG. 9B), but in reality, it is unknown whether they are the normal waveform or the arrhythmic waveform. The data restoration unit 34 restores the data 131 and 13J for determination generated by the data conversion unit 32 to generate restored data 15A and 15B using a learned model 42 learned by the learning unit 33.

The learned model 42 performs the feature extraction and the restoration of the normal waveform, and thus when the data 131 for determination of normal waveform origin is input, the learned model 42 can correctly perform the feature extraction and the restoration. When the data 13J for determination of arrhythmia origin is input, on the other hand, the learned model 42 cannot extract the feature of arrhythmia, and the restoration accuracy is low.

After the restoration processing, the difference calculation unit 35 generates difference data between the data for determination (the three-dimensional feature data) generated at Step S202 and the three-dimensional feature data restored at Step S204 (Step S205). Subsequently, the difference calculation unit 35 calculates a difference amount from the difference data (Step S206).

Figure 10A:
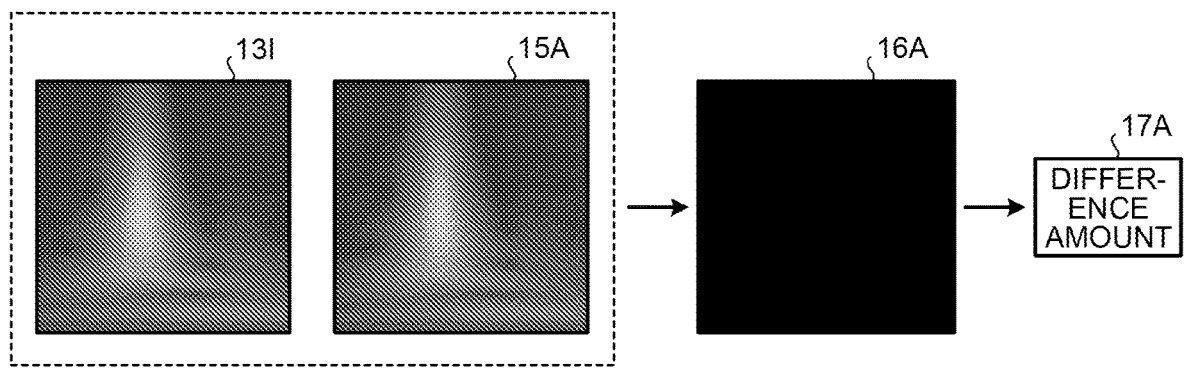
FIG. 10A is a diagram (No. 1) of a processing example by a difference calculation unit according to the first embodiment.
Figure 10B:
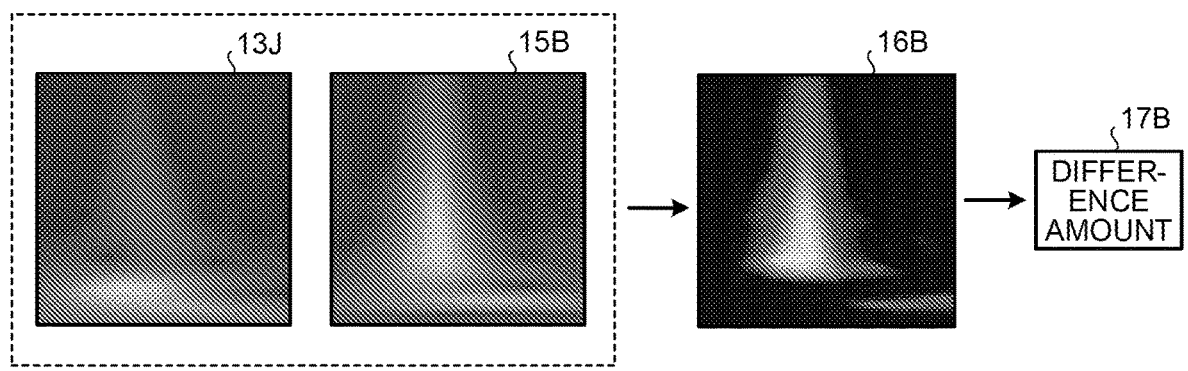
FIG. 10B is a diagram (No. 2) of the processing example by the difference calculation unit according to the first embodiment.

FIG. 10A and FIG. 10B are diagrams of processing examples by the difference calculation unit 35 according to the first embodiment. The difference calculation unit 35 compares the data for determination and the restored data, which are the input and output, respectively, in the data restoration unit 34, generates difference data as the difference therebetween, and calculates a difference amount based on the difference data. For the calculation of the difference amount, general methods of difference calculation such as root mean square error (RMSE) and mean absolute error (MAE) can be used, for example, but this is not limiting. When the data 131 for determination is input to the data restoration unit 34, the learned model 42 can correctly restore the feature of the normal waveform, and thus difference data 16A is data with flat intensity distribution (black in this case), and the value of a difference amount 17A is small (refer to FIG. 10A). When the data 13J for determination is input to the data restoration unit 34, on the other hand, the learned model 42 cannot correctly restore the feature of arrhythmia, and difference data 16B is data with nonuniform intensity distribution, and the value of a difference amount 17B is large (refer to FIG. 10B).

The determination unit 36 determines whether the waveform data obtained from the object 1 to be determined is normal or arrhythmia based on the difference amount calculated at Step S206 (Step S207). Subsequently, the determination unit 36 outputs a determined result (Step S208).

Figure 11A:
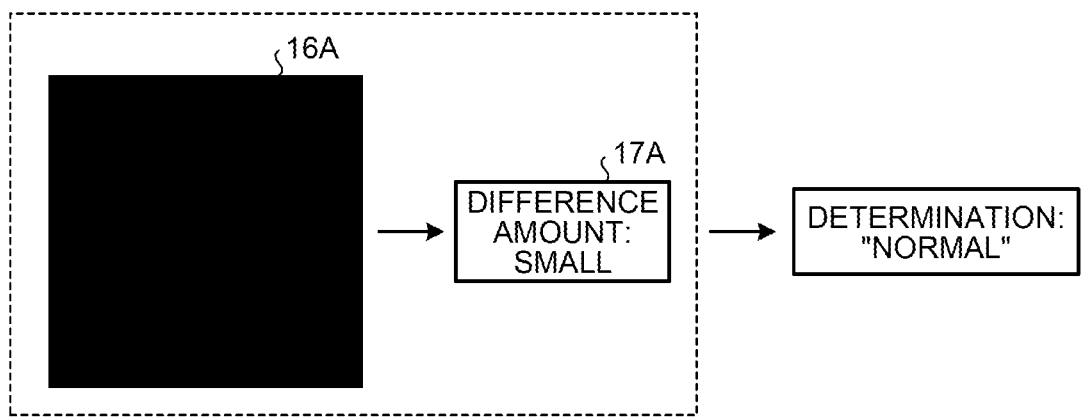
FIG. 11A is a diagram (No. 1) of a processing example by a determination unit according to the first embodiment.
Figure 11B:
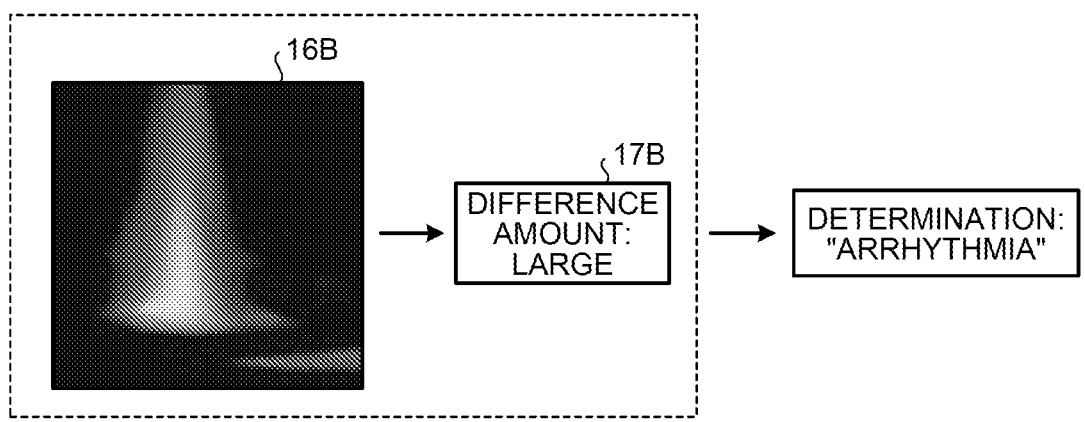
FIG. 11B is a diagram (No. 2) of the processing example by the determination unit according to the first embodiment.

Specifically, the determination unit 36 determines being normal or arrhythmia depending on whether the difference amount (e.g., the difference amounts 17A and 17B) calculated by the difference calculation unit 35 is smaller than a preset threshold and outputs a determined result. FIG. 11A and FIG. 11B are diagrams of processing examples by the determination unit according to the first embodiment. Let us assume that the difference amount 17A is smaller than the threshold and the difference amount 17B is larger than the threshold. As illustrated in FIG. 11A, the difference amount 17A is small in the difference amount and is thus determined to be "normal" As illustrated in FIG. 11B, on the other hand, the difference amount 17B is large in the difference amount and is thus determined to be "arrhythmia".

Figure 12:
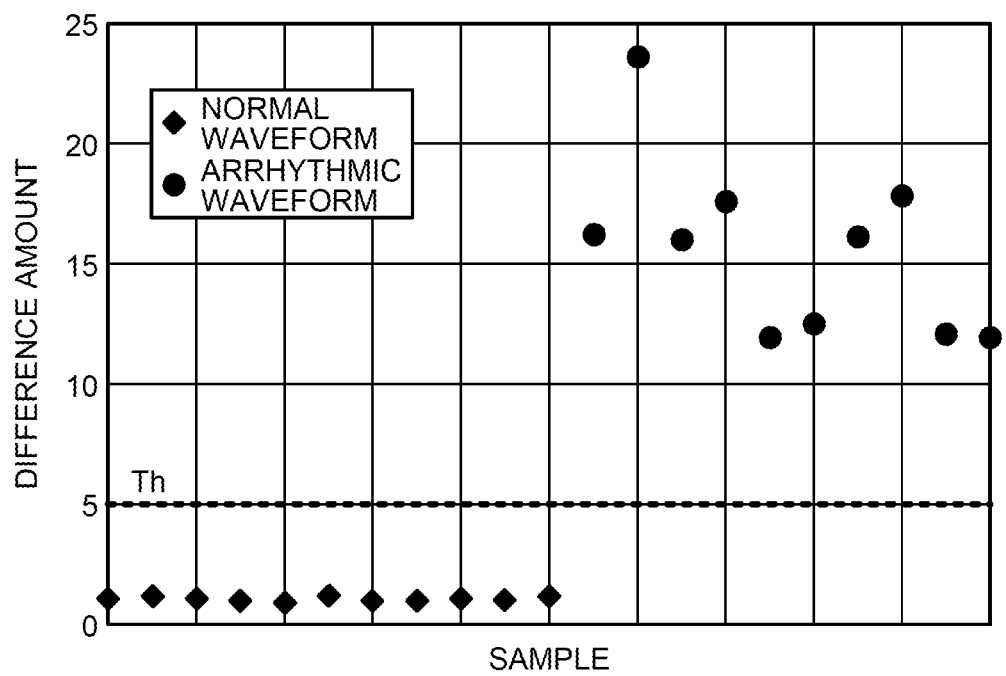
FIG. 12 is a diagram of an analysis example by processing according to the first embodiment.

FIG. 12 is a diagram of an analysis example by processing according to the first embodiment. Specifically, in the determination processing, 10 samples of each of the data 14A for determination and the data 14B for determination (refer to FIG. 6A and FIG. 6B) are given as the data for determination, and difference amounts calculated by RMSE described above are illustrated. In this process, as described above, the difference amount of arrhythmic waveform origin is larger than the difference amount of normal waveform origin, and setting a threshold Th based on this difference enables determination of arrhythmia.

In principle, the determination processing is executed after the learning processing. However, if a learned model has already been output by the learning processing, it is possible to omit the learning processing and determine being normal or arrhythmia by using the existing learned model.

According to the first embodiment described above, the determination unit 36 can determine waveform data different from the normal waveform data, that is, arrhythmia. In addition, if the unit for performing determination is shortened, determination is enabled even when a sufficiently continuous amount of data cannot be processed under the influence of noise or the like, and furthermore, determination is enabled even for arrhythmia occurring singly.

Second Embodiment

The following describes a second embodiment of the present invention. The present second embodiment depends on the first embodiment. The configuration of a biosignal analysis system according to the second embodiment is the same as that of the biosignal analysis system 3 according to the first embodiment, and thus a description thereof is omitted. The following describes parts different from the first embodiment.

In the present second embodiment, the learning unit 33 generates a plurality of learned models by classifying the known data 14X for learning for use in learning into data groups for learning based on the feature of the waveform shape of the original unit waveform data and performing learning for each data group for learning of the classified type (feature). Examples of the feature of the waveform shape referred to here include the amount of depression of the S wave and the height of the T wave. In the second embodiment, the learning unit 33 has a plurality of auto-encoders provided for each classification type. Each auto-encoder generates a learned model for each classification type. The number of the learned models (auto-encoders) prepared in the learning unit 33 in the present second embodiment can be set freely, but it is preferable that there be four or more.

The determination processing in the present second embodiment differs only in the learned model acquisition processing (Step S203 illustrated in FIG. 5), and the rest follows the flowchart illustrated in FIG. 5. In the learned model acquisition processing, one data group for learning or one learned model (auto-encoder) is selected from the data groups for learning or the learned models (auto-encoders) of the learning unit 33 based on the feature of the waveform shape of the unit waveform data in the object 1 to be determined. The model for learning to be selected is determined in accordance with the purpose, but it is preferably the most appropriate one for the determination processing. Examples of a method for selecting the optimum learned model include a method of applying each processing to the learned models and the waveform data obtained from the object 1 to be determined by the data restoration unit 34 and the difference calculation unit 35 and selecting a learned model with the smallest output difference amount, but this is not limiting.

In the first embodiment, as the feature of the learning processing, the unit waveform data is subjected to the time-frequency conversion by the data conversion unit 32, and thereby the differences among individuals can be reduced. However, using the learned model in the present second embodiment can further reduce the differences among individuals and improve the determination accuracy.

In addition, the normal waveform obtained from objects to be determined that have developed cardiac hypertrophy or cardiac enlargement differs in the feature of the waveform shape from that obtained from ordinary persons who have not developed cardiac hypertrophy or cardiac enlargement. Thus, the learned model learned with the electrocardiographic information 10 obtained from ordinary persons cannot correctly restore the feature of the normal waveform based on cardiac hypertrophy or cardiac enlargement, and the unevenness of the intensity distribution of the difference data and the value of the difference amount increase, which may be falsely determined to be arrhythmia. In such a case, the learning unit 33 in the present second embodiment prepares a learned model for cardiac hypertrophy or a model for cardiac enlargement, and thereby arrhythmia can be determined with high accuracy even for objects to be determined that have developed cardiac hypertrophy or cardiac enlargement.

Third Embodiment

The following describes a third embodiment of the present invention. The configuration of a biosignal analysis system according to the third embodiment is the same as that of the biosignal analysis system 3 according to the first embodiment, and thus a description thereof is omitted. The following describes parts different from the first embodiment.

In the present third embodiment, the learning unit 33 performs learning with a combination of known data for learning including an object to be determined other than the object to be determined itself (hereinafter, referred to as the data 14X for learning) and data for learning based on the waveform data of the normal waveform obtained from the object to be determined itself (hereinafter, referred to as data 14Y for learning). Examples of the learning with a combination of the data 14X for learning and the data 14Y for learning include a method of performing learning with the data 14X for learning and the data 14Y for learning as one data group, but this is not limiting. By using a thus obtained learned model as the learned model of the data restoration unit 34 in the determination processing, the restoration accuracy increases, and the determination accuracy can improve.

In the first embodiment and the second embodiment, as the feature of the learning processing, the unit waveform data is subjected to the time-frequency conversion by the data conversion unit 32, and thereby the differences among individuals can be reduced. However, using the learning processing by the learning unit 33 according to the present third embodiment can further eliminate the differences among individuals by the data for learning obtained from the object to be determined itself and improve the determination accuracy. The learned model thus learned may be diverted as the learned model in the first embodiment. Learning by the learning unit 33 in the present third embodiment is made possible by the fact that only the normal waveform data, which is easily available in large quantities, is necessary for learning of the learned model, and the degree of difficulty of learning is extremely low.

Fourth Embodiment

The following describes a fourth embodiment of the present invention. The present fourth embodiment depends on the third embodiment. The configuration of a biosignal analysis system according to the fourth embodiment is the same as that of the biosignal analysis system 3 according to the first embodiment, and thus a description thereof is omitted. The following describes parts different from the third embodiment.

In the present fourth embodiment, the learning unit 33 has a plurality of learned models obtained by classifying the known data 14X for learning for use in learning into data groups for learning based on the feature of the waveform shape of the original unit waveform data and performing learning based on the classified data groups for learning. Examples of the feature of the waveform shape referred to here include the amount of depression of the S wave and the height of the T wave. In the fourth embodiment, the learning unit 33 has a plurality of auto-encoders provided for each classification type. Each auto-encoder generates a learned model for each classification type. The number of the data groups for learning or the learned models (auto-encoders) prepared by the learning unit 33 in the present embodiment can be set freely, but it is preferable that there be four or more.

The learning processing or the determination processing in the present fourth embodiment basically follows the flowchart illustrated in FIG. 4 or FIG. 5, but in the learned model generation processing (Step S102 illustrated in FIG. 4) and the learned model acquisition processing (Step S203 illustrated in FIG. 5), based on the feature of the waveform shape of the unit waveform data in the object 1 to be determined, one data group for learning or one learned model or preferably the optimum one is selected from the data groups for learning or the learned models of the learning unit 33 and is used for learning or determination. Examples of a method for selecting the optimum data group for learning or learned model include a method of applying each processing to a plurality of learned models learned based on the data groups for learning and the normal waveform data obtained from the object 1 to be determined by the data restoration unit 34 and the difference calculation unit 35 and selecting one with the smallest output difference amount, but this is not limiting.

In the third embodiment, as the feature of the learning processing, the differences among individuals can be further eliminated by the data 14Y for learning obtained from the object to be determined itself. However, using the learning processing by the learning unit 33 according to the fourth embodiment can further reduce the differences among individuals and improve the determination accuracy.

In addition, the normal waveform obtained from objects to be determined that have developed cardiac hypertrophy or cardiac enlargement differs in the feature of the waveform shape from that obtained from ordinary persons. Thus, the learned model learned with the electrocardiographic information 10 obtained from ordinary persons cannot correctly restore the feature of the normal waveform based on cardiac hypertrophy or cardiac enlargement, and the unevenness of the intensity distribution of the difference data and the value of the difference amount increase, which may be falsely determined to be arrhythmia. In such a case, the learning unit 33 in the present embodiment prepares a data group for learning or a learned model for cardiac hypertrophy or cardiac enlargement, and thereby arrhythmia can be determined with high accuracy even for objects to be determined that have developed cardiac hypertrophy or cardiac enlargement. The learned model 42 thus learned may be diverted as the learned model in the first to third embodiments.

Fifth Embodiment

The following describes a fifth embodiment of the present invention. The configuration of a biosignal analysis system according to the fifth embodiment is the same as that of the biosignal analysis system 3 according to the first embodiment, and thus a description thereof is omitted. The following describes parts different from the first embodiment.

The learning processing in the present fifth embodiment basically follows the flowchart illustrated in FIG. 4, but in the learned model generation processing (Step S102 illustrated in FIG. 4), the learning unit 33 performs learning using only the data 14Y for learning obtained from the object to be determined itself. By using a thus obtained learned model as the learned model of the data restoration unit 34 in the determination processing, the restoration accuracy increases, and the determination accuracy can improve.

In the third embodiment, as the feature of the learning processing, the differences among individuals can be further eliminated by the known data 14X for learning including the object to be determined other than the object to be determined itself and the data 14Y for learning obtained from the object to be determined itself. However, using the learning processing by the learning unit 33 according to the present fifth embodiment can completely eliminate the differences among individuals by using only the data 14Y for learning obtained from the object to be determined itself and improve the determination accuracy. That is also effective when there is no corresponding data group for learning or learned model in the second embodiment and the fourth embodiment. The learned model thus learned may be diverted as the learned model in the first to fourth embodiments. Learning using the data 14Y for learning obtained from the object to be determined itself by the learning unit 33 in the present fifth embodiment is made possible by the fact that only the normal waveform data of the object to be determined itself, which is easily available in large quantities, is necessary for learning of the learned model, and the degree of difficulty of learning is extremely low.

Sixth Embodiment

The following describes a sixth embodiment of the present invention. The configuration of a biosignal analysis system according to the sixth embodiment is the same as that of the biosignal analysis system 3 according to the first embodiment, and thus a description thereof is omitted. The following describes parts different from the first embodiment.

In (b) of FIG. 6B, in the three-dimensional feature data 13E of atrial fibrillation origin, the arrhythmia-specific features appear in the regions $R_1$ and $R_2$, but these features are so weak that they may be lost in the restoration processing by the data restoration unit 34 or become small as the difference amount of the entire data in the arrhythmia determination by the determination unit 36, which may make separation from the normal waveform data difficult.

Figure 13A:
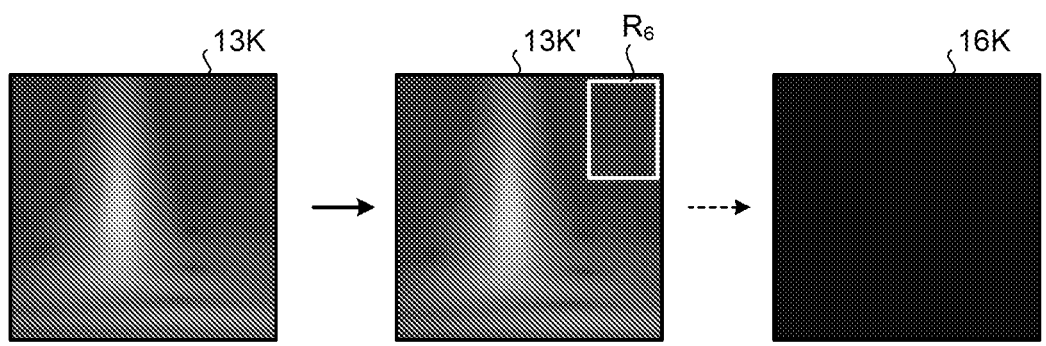
FIG. 13A is a diagram (No. 1) of a weighting example of an arrhythmia-specific feature in three-dimensional feature data according to a sixth embodiment.
Figure 13B:
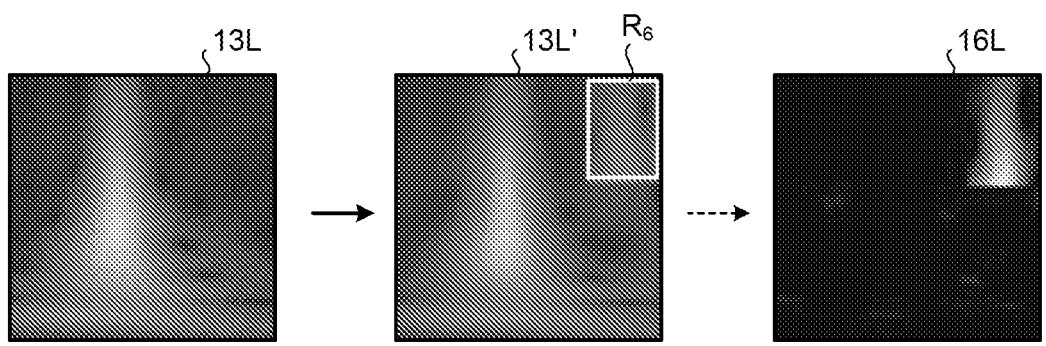
FIG. 13B is a diagram (No. 2) of the weighting example of the arrhythmia-specific feature in the three-dimensional feature data according to the sixth embodiment.

Given this situation, the data conversion unit 32 in the present sixth embodiment performs weighting on a time-frequency feature region in which an arrhythmia-specific feature appears in the data for determination. FIG. 13A and FIG. 13B are diagrams of weighting examples of an arrhythmia-specific feature in the three-dimensional feature data according to the sixth embodiment. In FIG. 13A and FIG. 13B, as an example, the weighting of the feature of atrial fibrillation is performed based on a region $R_6$, for which a range is set for time and frequency each, but this is not limiting. In weighted data 13K', in which the weighting of the region $R_6$ is performed based on data 13K for determination known to be of normal waveform origin, for example, the effect of weighting is extremely small, and difference data 16K to be obtained has flat intensity distribution as in the example in FIG. 10A (refer to FIG. 13A). In weighted data 13L', in which the weighting of the region $R_6$ is performed based on data 13L for determination known to be of atrial fibrillation origin, on the other hand, a large feature appears in the region $R_6$, and thus difference data 16L to be obtained is data with nonuniform intensity distribution (refer to FIG. 13B).

Thus, the data conversion unit 32 in the present sixth embodiment performs weighting in advance on the weak arrhythmia-specific features such as the F wave 11$f$ (refer to (b) of FIG. 2, for example) of atrial fibrillation or atrial flutter and can thereby prevent loss of the features due to restoration. Consequently, separation between the normal waveform data and the arrhythmic waveform data is made easy.

Seventh Embodiment

The following describes a seventh embodiment of the present invention. The configuration of a biosignal analysis system according to the seventh embodiment is the same as that of the biosignal analysis system 3 according to the first embodiment, and thus a description thereof is omitted. The following describes parts different from the first embodiment.

Figure 14:
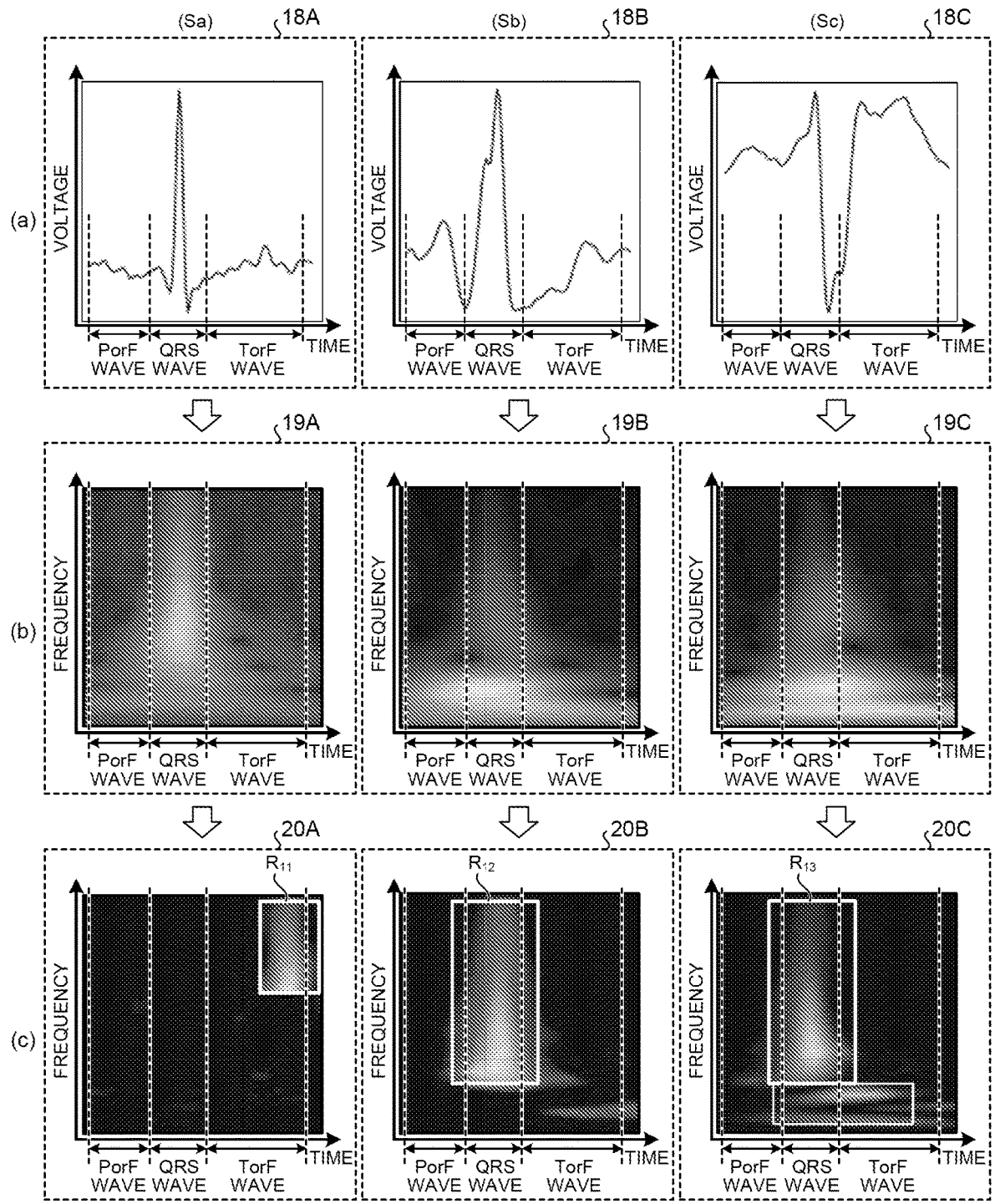
FIG. 14 is a diagram of identification examples of an arrhythmia factor based on time-frequency coordinates according to a seventh embodiment.

FIG. 14 is a diagram of identification examples of an arrhythmia factor based on time-frequency coordinates according to the present seventh embodiment. In FIG. 14, (Sa), (Sb), and (Sc) show examples of electrocardiographic information related to atrial fibrillation, ventricular extrasystoles, and ventricular hypertrophy, respectively. Pieces of unit waveform data corresponding to the respective cases are the pieces of data illustrated in (a) of FIG. 14 (unit waveform data 18A to 18C), pieces of data for determination obtained by performing frequency conversion on these pieces of unit waveform data are the pieces of data illustrated in (b) of FIG. 14 (data 19A to 19C for determination), and pieces of difference data based on these pieces of data for determination and pieces of data for determination after restoration are the pieces of data illustrated in (c) of FIG. 14 (difference data 20A to 20C). In the first to third embodiments, the determination unit 36 only determines being normal or arrhythmia based on the normal waveform and can determine arrhythmia regardless of its type, but it cannot identify an arrhythmia factor. Identification of the arrhythmia factor referred to here means identifying arrhythmia or its disease name or narrowing down the arrhythmia factor with a broad frame such as "caused by R wave" set.

Thus, the determination unit 36 in the present seventh embodiment does not simply determine arrhythmia but identifies the arrhythmia factor by referring to coordinates in which the feature of the arrhythmia factor appears. The known data 14X for learning and the pieces of data 19A to 19C for determination can section waveform components (the P wave 11a, the Q wave 11b, the R wave 11c, the S wave 11d, the T wave 11e, and the F wave 11f illustrated in FIG. 2) from a time coordinate. It is also possible to read what kind of waveform is being drawn from the transition state of a band. As an example, FIG. 14 illustrates an example of sectioning into a section containing the P wave or the F wave (a PorF wave), a section containing the Q wave, the R wave, and the S wave (a QRS wave), and a section containing the T wave and the F wave (a TorF wave). If a band showing intensity has shifted toward a lower frequency direction in the time coordinate in which the R wave 11c appears as in ventricular extrasystole (Sb), for example, it means that the width of the R wave 11c has increased. Thus, based on the difference data obtained from the data for determination and the restored data, the difference amount is calculated for each of designated coordinate ranges (e.g., regions $R_{11}$, $R_{12}$, $R_{13}$, and $R_{14}$), and from their magnitude or their relation, the arrhythmia factor can be identified. In this case, the designation of the coordinate ranges may be done automatically by image processing such as edge detection, for example, or a user may input designation ranges via the input unit 31.

Another effect of the determination unit 36 in the present seventh embodiment is that the difference amount is calculated for each designated coordinate range, and thus determination is easy even for weak features such as the occurrence of the F wave of atrial fibrillation.

Other Embodiments

The aspects for performing the present invention have been described, but the present invention should not be limited only by the embodiments described above. The biosignal analysis system 3 is described as including the learning unit 33, for example, but the biosignal analysis system 3 may be configured to acquire a learned model via a communication network without having the learning unit 33. The information to be analyzed is not limited to the electrocardiographic information, and any information using the waveform data described above can be used.

INDUSTRIAL APPLICABILITY

Using the integrated biosignal analysis system according to the present invention enables determination of arrhythmia based on electrocardiographic information.

REFERENCE SIGNS LIST

1 OBJECT TO BE DETERMINED
2 BIOSIGNAL MEASURING DEVICE
3 BIOSIGNAL ANALYSIS SYSTEM
10 ELECTROCARDIOGRAPHIC INFORMATION
11 WAVEFORM DATA
12 and 12A to 12H UNIT WAVEFORM DATA
13 and 13A to 13H THREE-DIMENSIONAL FEATURE DATA
131 to 13L, 14A, 14B, and 19A to 19C DATA FOR DETERMINATION
13K' and 13L' WEIGHTED DATA
14X DATA FOR LEARNING
15A and 15B RESTORED DATA
16A, 16B, 16K, 16L, and 20A to 20C DIFFERENCE DATA
17A and 17B DIFFERENCE AMOUNT
31 INPUT UNIT
32 DATA CONVERSION UNIT
33 LEARNING UNIT
34 DATA RESTORATION UNIT
35 DIFFERENCE CALCULATION UNIT
36 DETERMINATION UNIT
37 CONTROL UNIT
38 STORAGE UNIT
41a and 41b AUTO-ENCODER
42 LEARNED MODEL
43 INPUT DATA

The invention claimed is:

1. An integrated biosignal analysis system performing determination of arrhythmia based on electrocardiographic information, the biosignal analysis system comprising:
an input unit configured to receive input of the electrocardiographic information;
a data conversion unit configured to perform time-frequency conversion on the electrocardiographic information to generate data for determination;
a data restoration unit configured to restore the data for determination using a learned model including an auto-encoder to generate restored data;
a difference calculation unit configured to calculate a difference amount between the restored data and the data for determination; and
a determination unit configured to determine whether the data for determination is either of normal waveform data and arrhythmic waveform data based on the difference amount.

2. The biosignal analysis system according to claim 1, wherein the learned model is a model generated by learning using a plurality of pieces of known data for learning, 95% or more of which are generated based on normal waveform data.

3. The biosignal analysis system according to claim 1, wherein the learned model is a model generated by learning using a plurality of pieces of known data for learning, 95% or more of which are generated based on normal waveform data, and data for learning acquired from an object for which determination is performed.

4. The biosignal analysis system according to claim 1, wherein the learned model is a model generated by learning using data for learning acquired from an object to be determined.

5. The biosignal analysis system according to claim 1, wherein
the input unit is configured to segment waveform data of the electrocardiographic information into unit waveform data in which waveform data in a predetermined time range is extracted, and
the data conversion unit is configured to perform time-frequency conversion on the unit waveform data to generate the data for determination.

6. The biosignal analysis system according to claim 1, wherein the data conversion unit is configured to generate weighted data in which a time-frequency feature region of arrhythmia in the data for determination is weighted.

7. The biosignal analysis system according to claim 1, wherein
the difference calculation unit is configured to generate difference data indicating a difference between the restored data and the data for determination and calculate the difference amount based on the difference data, and
the determination unit is configured to identify an arrhythmia factor based on a time and frequency feature of the difference data.

8. The biosignal analysis system according to claim 1, wherein the learned model is a model generated by learning using data for learning known to be the normal waveform data.

9. The biosignal analysis system according to claim 1, further comprising a learning unit configured to perform learning of the auto-encoder using data for learning to generate the learned model.

10. The biosignal analysis system according to claim 2, further comprising a learning unit configured to perform learning of the auto-encoder using the data for learning to generate the learned model, wherein
the learning unit
includes a plurality of auto-encoders corresponding to features of the known data for learning, and
is configured to select one auto-encoder from the auto-encoders based on a feature of normal waveform data of an object to be determined.

11. The biosignal analysis system according to claim 3, further comprising a learning unit configured to perform learning of the auto-encoder using the data for learning to generate the learned model, wherein
the learning unit
includes a plurality of data groups for learning or a plurality of auto-encoders corresponding to features of the pieces of known data for learning and
is configured to select one data group for learning or one auto-encoder from the data groups for learning or the auto-encoders based on a feature of normal waveform data of an object to be determined.

* * * * *